(12) United States Patent
Berridge et al.

(10) Patent No.: US 12,078,996 B2
(45) Date of Patent: Sep. 3, 2024

(54) SYSTEM AND METHOD FOR IMPLEMENTING END-OF-ROW TURNS FOR AGRICULTURAL MACHINES

(71) Applicant: CNH Industrial America LLC, New Holland, PA (US)

(72) Inventors: Andrew Berridge, Burr Ridge, IL (US); Yaseen Suleman, Glendale Heights, IL (US); Brett McClelland, Chicago, IL (US); Kousha Moaveninejad, La Grange, IL (US); Thomas Damme, Göschitz (DE); Frank Glowna, Jena (DE); Andreas Nennstiel, Jena (DE)

( * ) Notice: Subject to any disclaimer, the term of this patent is extended or adjusted under 35 U.S.C. 154(b) by 208 days.

(21) Appl. No.: 17/355,599

(22) Filed: Jun. 23, 2021

(65) Prior Publication Data

US 2021/0405644 A1 Dec. 30, 2021

Related U.S. Application Data (60) Provisional application No. 63/046,064, filed on Jun. 30, 2020.

(51) Int. Cl.
*G05D 1/00* (2006.01)
*A01B 69/04* (2006.01)
*A01B 79/00* (2006.01)

(52) U.S. Cl.
CPC ......... *G05D 1/0219* (2013.01); *A01B 69/008* (2013.01); *A01B 79/005* (2013.01); *G05D 1/0223* (2013.01)

(58) Field of Classification Search
CPC ............... G05D 1/0219; G05D 1/0223; G05D 2201/0201; A01B 69/008; A01B 79/005
See application file for complete search history.

(56) References Cited

U.S. PATENT DOCUMENTS

| 9,968,025 | B2 * | 5/2018 | Bunderson | G05D 1/0217 |
| 2008/0249692 | A1 * | 10/2008 | Dix | A01B 69/008 |
| | | | | 701/50 |
| 2016/0120095 | A1 * | 5/2016 | Fujimoto | A01B 69/008 |
| | | | | 701/24 |
| 2017/0308091 | A1 * | 10/2017 | Bunderson | A01B 69/008 |
| 2017/0354079 | A1 * | 12/2017 | Foster | G05D 1/0276 |

(Continued)

*Primary Examiner* — Abdalla A Khaled
(74) *Attorney, Agent, or Firm* — Rickard K. DeMille; Rebecca L. Henkel; Peter K. Zacharias (57) ABSTRACT

A method for implementing end-of-row (EOR) turns within a field includes accessing a location of a work boundary outlining a work area of the field within which an agricultural machine is configured to perform an agricultural operation, and generating a boundary-based EOR turn path for the agricultural machine between an end point of a first path extending across the work area and a start point of a second path extending across the work area, with the boundary-based EOR turn path being defined relative to the work boundary such that the agricultural machine is maintained spaced apart from the boundary by at least a minimum buffer distance as the machine is traversed between the end point of the first path and the start point of the second path. In addition, the method includes automatically executing an EOR turn along the boundary-based EOR turn path and/or displaying the boundary-based EOR turn path.

16 Claims, 7 Drawing Sheets

(56) References Cited

U.S. PATENT DOCUMENTS

| | | | | |
|---|---|---|---|---|
| 2018/0359904 A1* | 12/2018 | Foster | ................... | G05D 1/0217 |
| 2019/0239416 A1* | 8/2019 | Green | ................... | A01B 69/007 |
| 2019/0353483 A1* | 11/2019 | Liu | ...................... | A01B 69/008 |
| 2020/0363811 A1* | 11/2020 | Nishii | ..................... | G01C 21/20 |
| 2021/0339768 A1* | 11/2021 | Kakkar | ................ | A01B 69/008 |
| 2022/0091271 A1* | 3/2022 | Iwase | ....................... | G01S 15/86 |
| 2022/0183211 A1* | 6/2022 | Kinuta | ................. | G05D 1/0061 |
| 2023/0031053 A1* | 2/2023 | Kodama | ............. | B62D 15/025 |

* cited by examiner

SYSTEM AND METHOD FOR IMPLEMENTING END-OF-ROW TURNS FOR AGRICULTURAL MACHINES

CROSS-REFERENCE TO RELATED APPLICATIONS

The present application is based upon and claims the right of priority to U.S. Provisional Patent Application No. 63/046,064, filed Jun. 30, 2020, the disclosure of which is hereby incorporated by reference herein in its entirety for all purposes.

FIELD OF THE INVENTION

The present subject matter relates generally to guidance systems for agricultural machines, and, more particularly, to systems and methods for automatically implementing end-of-row turns for an agricultural machine.

BACKGROUND OF THE INVENTION

Agricultural vehicles, such as tractors, harvesters, etc., are commonly used to perform a variety of agricultural tasks (e.g., to tow planters or seeders for planting seeds, to tow spraying implements for applying fertilizer, to tow tillage implements for tillage operations, for harvesting agricultural product, etc.). Traditionally, agricultural vehicles have been manually operated by the operator. That is, the steering and speed of an agricultural vehicle have been controlled by an operator driving the vehicle. Recent developments integrating GPS-based navigation systems into agricultural vehicle control systems have enabled automatic or semi-automatic steering modes. For example, some agricultural vehicles may include a control system configured to automatically direct the vehicle to follow a path between, over, or adjacent to rows in a field. For many such control systems, end-of-row turns are executed manually. For example, when the agricultural vehicle reaches the end of a first swath or row, the operator raises, turns off, or otherwise disengages the agricultural implement; the operator then manually controls the speed and steering of the agricultural vehicle to guide the vehicle through the end-of-row turn connecting the end of the first swath to the beginning of a second swath or row. The operator then lowers, turns on, or otherwise engages the agricultural implement and an automatic or semi-automatic control system guides the agricultural vehicle along the second path.

To alleviate such manual operation, more recent vehicle control systems have been developed that include algorithms configured to automatically generate a turn path for executing an end-of-row turn. However, to date, such algorithms typically focus on simply ensuring that a given end-of-row turn can be achieved based on the vehicle's current speed. This can lead to the generation of unpredictable and often undesirable turning paths, which can be problematic in instances in which limited space is available outside the field boundary and/or for fields having complex shapes. For example, conventional algorithms will often generate turning paths that cross over the field boundary and back into the work area of the field, which can result in crop damage, unnecessary soil compaction, and/or the like.

Accordingly, an improved system and method for automatically executing end-of-row turns that addresses one or more of the issues in the prior art would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for implementing end-of-row (EOR) turns within a field. The method includes accessing, with a computing system, a location of a work boundary outlining a work area of the field within which an agricultural machine is configured to perform an agricultural operation, and generating, with the computing system, a boundary-based EOR turn path for the agricultural machine between an end point of a first path extending across the work area and a start point of a second path extending across the work area, with the boundary-based EOR turn path being defined relative to the work boundary such that the agricultural machine is maintained spaced apart from the work boundary by at least a minimum buffer distance as the agricultural machine is traversed between the end point of the first path and the start point of the second path. In addition, the method includes at least one of automatically executing an EOR turn along the boundary-based EOR turn path or displaying the boundary-based EOR turn path.

In another aspect, the present subject matter is directed to a method for implementing end-of-row (EOR) turns within a field, with the field including a work area within which an agricultural operation is to be performed. The method includes generating, with a computing system, an initial EOR turn path for an agricultural machine between an end point of a first path extending across the work area and a start point of a second path extending across the work area, with the work area being outlined by a work boundary. The method also includes identifying, with the computing system, that the agricultural machine will cross over the work boundary along at least a portion of the initial EOR turn path, and generating, with the computing system, a new EOR turn path for the agricultural machine based on a location of the work boundary within the field, with the new EOR turn path being defined relative to the work boundary such that the agricultural machine is maintained spaced apart from the work boundary by at least a minimum buffer distance as the agricultural machine is traversed between the end point of the first path and the start point of the second path. Additionally, the method includes at least one of automatically executing an EOR turn along the new EOR turn path or displaying the new EOR turn path.

In a further aspect, the present subject matter is directed to a system for implementing end-of-row (EOR) turns within a field. The system includes an agricultural machine comprising an agricultural vehicle and an agricultural implement. The system also includes a computing system provided in operative association with the agricultural machine, with the computing system including a processor and associated memory. The memory stores instructions that, when executed by the processor, configure the computing system to access a location of a work boundary outlining a work area of the field within which the agricultural machine is configured to perform an agricultural operation, and generate a boundary-based EOR turn path for the agricultural machine between an end point of a first path extending across the work area and a start point of a second path extending across the work area, with the boundary-based EOR turn path being defined relative to the work boundary such that the agricultural machine is maintained spaced apart from the work boundary by at least a minimum buffer distance as the agricultural machine is traversed between the end point of the first path and the start point of the second path. In addition, the computing system is configured to at least one of automatically execute an EOR turn along the boundary-based EOR turn path or display the boundary-based EOR turn path.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and method for implementing end-of-row (EOR) turns for agricultural machines. Specifically, in several embodiments, a computing system associated with an agricultural machine may be configured to generate an EOR turn path that accounts for the location of a work boundary within a field, with the work boundary generally outlining a work area of the field within which the agricultural machine is configured perform an agricultural operation (e.g., planting, tilling, spraying, harvesting, and/or the like). For example, the boundary-based EOR turn path may be generated such that the agricultural machine is maintained spaced apart from the work boundary by at least a minimum buffer distance, thereby ensuring that no portion of the machine crosses over the work boundary and into the work area of the field during the execution of the EOR turn. In doing so, the boundary-based EOR turn path may generally track or follow the profile of the work boundary, such as by extending generally parallel to the work boundary. Upon generation of the boundary-based EOR turn path, the computing system may, in several embodiments, be configured to automatically guide the agricultural machine along the EOR turn path to execute the associated EOR turn. In addition to such automatic guidance (or as an alternative thereto), the computing system may be configured to display the boundary-based EOR turn path to the operator, such as by presenting the EOR turn path within a field map displayed to the operator via an associated display device.

Figure 1:
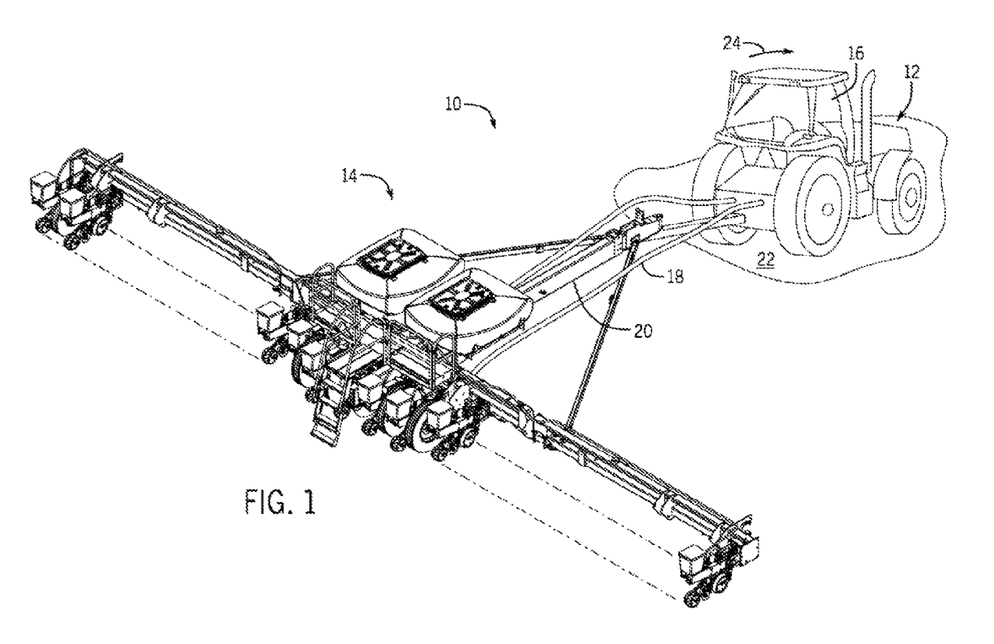
FIG. 1 illustrates a perspective view of one embodiment of an agricultural machine in accordance with aspects of the present subject matter.

Referring now to the drawings, FIG. 1 illustrates a perspective view of one embodiment of an agricultural machine 10 in accordance with aspects of the present subject matter. As shown, the agricultural machine 10 includes an agricultural vehicle 12 and an agricultural implement 14. In some embodiments, the agricultural implement 14 may be towed behind the agricultural vehicle 12 (e.g., as shown in FIG. 1). In other embodiments, the agricultural implement 14 may be incorporated into the agricultural vehicle 12 (e.g., as with combines, windrowers, forage harvesters, sugar cane harvesters, etc.). Additionally, in some embodiments, the agricultural machine 10 may simply include an agricultural vehicle 12 without having an agricultural implement 14 associated therewith.

In several embodiments, the agricultural vehicle 12 may be any vehicle suitable for towing the agricultural implement 14, such as a tractor, off-road vehicle, work vehicle, and/or the like. For instance, as shown in FIG. 1, the agricultural vehicle 12 is configured as a tractor including include a cab 16 in which an operator sits during operation of the vehicle 12. Alternatively, the vehicle 12 may have a cab-free configuration, such as when the vehicle 12 is configured as an autonomous vehicle. Additionally, in several embodiments, the agricultural implement 14 may generally be any suitable implement, such as a ground-engaging implement (e.g., a soil conditioner, a tillage implement, a fertilizer application implement, a planter, a seeder, etc.), a sprayer/applicator, and/or any other suitable implement suitable for agricultural use.

In one embodiment, a frame 20 of the agricultural implement 14 may be coupled to the agricultural vehicle 12 via a hitch 18 to allow the agricultural machine 10 to travel over a surface 22, such as the ground, a road, a field, or another surface, in a direction of travel 24. The hitch 18 may, for instance, be a three-point hitch that rigidly couples the implement 14 to the vehicle 12 such that the implement 14 can move upward and downward, but cannot freely rotate with respect to the vehicle 12. In other embodiments, the implement 14 may be coupled to the vehicle 12 via a drawbar, thereby allowing the implement 14 to move upward and downward, as well as rotate, with respect to the vehicle 12. It should be understood, however, that other systems for coupling the implement 14 to the vehicle 12 may be possible. For instance, in some embodiments, the implement 14 may be coupled to the front of the vehicle 12.

It should be appreciated the configuration of the agricultural machine 10 described above and shown in FIG. 1 is provided only to place the present subject matter in an exemplary field of use. In this regard, it should be apparent to those of ordinary skill in the art that the present subject matter may be readily adaptable to any manner of machine configuration, including any manner of vehicle and/or implement configuration.

Figure 2:
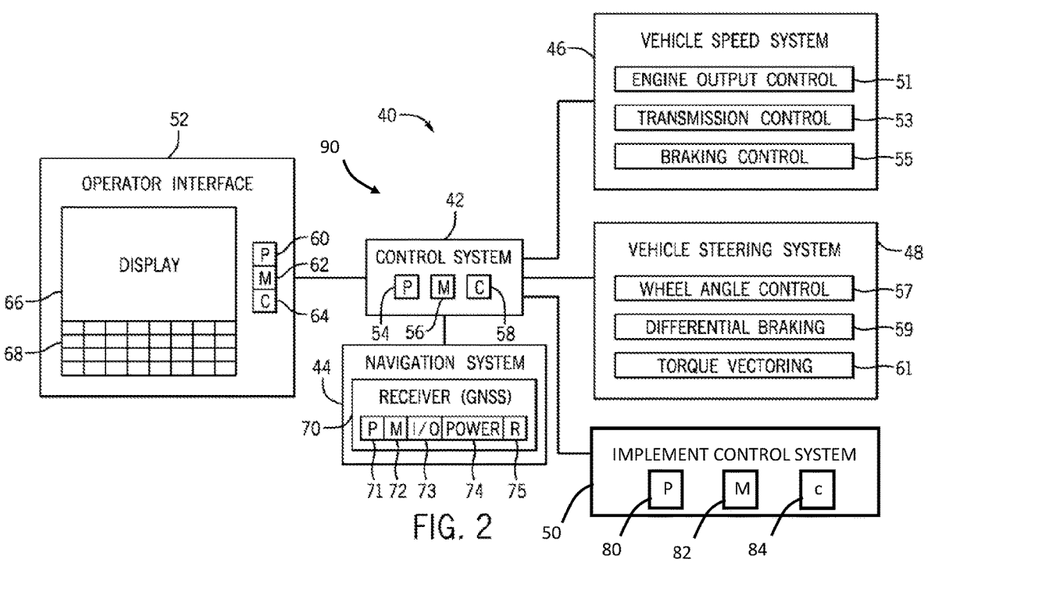
FIG. 2 illustrates a schematic view of one embodiment of a control system suitable for use with an agricultural machine in accordance with aspects of the present subject matter, particularly illustrating one embodiment of sub-systems that can be utilized to automatically generate an end-of-row turn path and subsequently execute an end-of-row turn along such path.

Referring now to FIG. 2, a schematic view of one embodiment of a control system 40 suitable for use with the agricultural machine 10 shown in FIG. 1 is illustrated in accordance with aspects of the present subject matter. In the illustrated embodiment, the control system 40 includes a vehicle control system 42, a navigation system 44, a vehicle speed system 46, a vehicle steering system 48, an implement control system 50, and an operator interface 52. However, it should be understood that other embodiments of the control system 40 may include different elements in alternative combinations.

In several embodiments, the vehicle control system 42 may include one or more computing devices and/or other computer-related components, such as one or more processors 54, one or more memory components 56, and communication circuitry 58. The processor(s) 54 may include one or more general-purpose processors, one or more application specific integrated circuits, one or more field programmable gate arrays, and/or the like. The memory 56 may be any tangible, non-transitory, computer readable medium that is capable of storing instructions executable by the processor 54 and/or data that may be processed by the processor 54. In other words, the memory 56 may include volatile memory, such as random-access memory, or non-volatile memory, such as hard disk drives, read-only memory, optical disks, flash memory, and the like. The communication circuitry 58 may be configured to receive inputs (e.g., feedback signals, sensor signals, etc.) and transmit outputs (e.g., control signals, command signals, etc.) to other systems or sub-systems, such as the navigation system 44, the vehicle speed system 46, the vehicle steering system 48, the implement control system 50, and/or the operator interface 52.

The navigation system 44 may be in communication with the vehicle control system 42 (e.g., via the communication circuitry 58). The navigation system may, in one embodiment, include a Global Navigation Satellite System (GNSS) receiver 70 configured to communicate with two or more satellites in orbit (e.g., GPS, GLONASS, Galileo, BeiDou, etc.) to determine the location, heading, speed, etc. of the vehicle 12. The receiver 70 may include one or more computing devices and/or computer-related components, such as one or more processors 71, one or more memory components 72, input/output channels 73, a power supply 74, and radio circuitry 75. The processors 71 may run software stored on the memory component(s) 72 to compute the position of the vehicle 12. Based on the computed position, the processor may also determine, for example, the vehicle's heading, speed, etc. In view of the information received from the navigation system 44, the vehicle control system 42 may be configured to determine (e.g., via the processor 54) the relative proximity of the agricultural machine 10 (e.g., the vehicle 12 and/or the implement 14) to one or more rows, swaths or guidance lines, one or more field boundaries, etc. Additionally, based on the vehicle position received from the navigation system 44, the vehicle control system 42 may also determine a path across a field, an end-of-row turn path from one swath to another, or a path to the nearest swath, and subsequently guide the agricultural machine 10 along such path.

The vehicle speed system 46 may be configured to control the speed of the agricultural vehicle 12 in the direction of travel 24. Control of the speed may be by control of a throttle, a clutch, brakes, a transmission, one or more other systems or sub-systems, or a combination thereof. In the illustrated embodiment, the speed control system 40 includes an engine output control system 51, a transmission control system 53, and a braking control system 55. The engine output control system 51 is configured to vary the output of an engine to control the speed of the vehicle 12. For example, the engine output control system 51 may vary a throttle setting of the engine, a fuel/air mixture of the engine, a timing of the engine, and/or any other suitable engine parameters to control engine output. In addition, the transmission control system 53 may adjust the gear selection within a transmission to control the speed of the vehicle 12. For example, the transmission control system 53 may allow for manual or automatic changing of gears or a gear ratio via the transmission as a way to control the speed of the vehicle 12. The transmission may include a number of fixed gear ratios or a continuously variable gear ratio. Furthermore, the braking control system 55 may adjust the braking force, thereby controlling the speed of the vehicle 12 (e.g., to slow the vehicle down at the end of a row in order to make a turn). While the illustrated vehicle speed system 46 includes the engine output control system 51, the transmission control system 53, and the braking control system 55, it should be appreciated that alternative embodiments may include any of these sub-systems in any suitable combination. Further embodiments may include a vehicle speed system 46 having other and/or additional sub-systems to facilitate adjusting the speed of the vehicle 12. The vehicle speed system 46 may be controlled by the operator in a manual mode of operation. In an automatic or semi-automatic mode of operation, the vehicle speed system 46 may be controlled automatically or semi-automatically by the vehicle control system 42.

Referring still to FIG. 2, the vehicle steering system 48 may control the steering of the agricultural vehicle 12. In the illustrated embodiment, the vehicle steering system 48 includes a wheel angle control system 57, a differential braking system 59, and a torque vectoring system 61. The wheel angle control system 57 may automatically rotate one or more wheels or tracks of the vehicle 12 (e.g., via mechanical or hydraulic actuators) to steer the vehicle 12 along a path. By way of example, the wheel angle control system 57 may rotate front wheels/tracks, rear wheels/tracks, and/or intermediate wheels/tracks of the vehicle 12, either individually or in groups. In some embodiments, steering may be accomplished by varying the speed of wheels or tracks on either side of the vehicle. In some embodiments, the wheel angle control system 57 may be hydraulically actuated rather than, or in addition to, being mechanically actuated (e.g., via gears). A hydraulically actuated steering system 48 may enable the agricultural vehicle 12 to turn without corresponding movement of a steering wheel (or other steering input device) inside the cab 16 during an automatic or semi-automatic drive mode. The differential braking system 59 may independently vary the braking force on each side of the vehicle 12 to direct the vehicle 12 along the path. Similarly, the torque vectoring system 61 may differentially apply torque from the engine to wheels and/or tracks on each side of the vehicle 12, thereby directing the vehicle 12 along the path. While the illustrated vehicle steering system 48 includes the wheel angle control system 57, the differential braking system 59, and the torque vectoring system 61, it should be appreciated that alternative embodiments may include any of these sub-systems in any suitable combination. Further embodiments may include a vehicle steering system 48 having other and/or additional sub-systems to facilitate directing the vehicle 12 along a desired path (e.g., an articulated steering system, etc.). The vehicle steering system 48 may be controlled by the operator in a manual mode of operation. In an automatic or semi-automatic mode of operation, the vehicle steering system 48 may be controlled automatically by the vehicle control system 42. For example, in a semi-automatic mode of operation, the steering system 48 may be automatically controlled by the vehicle control system 42, and the vehicle speed system 46 may be controlled by the operator. In a fully automatic mode of operation, both the vehicle speed system 46 and the vehicle steering system 48 may be controlled by the control system 42.

The implement control system 50 may be used to control one or more aspects of the operation of the implement 14. For example, the implement control system 50 may raise or lower the implement 14, turn the implement 14 on or off, or otherwise engage or disengage the implement 14, deploy ground-engaging tools of the implement 14, control the speed of the implement 14, etc., and/or a combination thereof. As shown in FIG. 2, the implement control system 50 may include or more computing devices and/or other computer-related components, such as one or more processors 80, one or more memory components 82, and communication circuitry 84. The processor 80 may include one or more general-purpose processors, one or more application specific integrated circuits, one or more field programmable gate arrays, and/or the like. The memory 82 may be any tangible, non-transitory, computer readable medium that is capable of storing instructions executable by the processor 80 and/or data that may be processed by the processor 80. The memory 82 may include volatile memory, such as random-access memory, or non-volatile memory, such as hard disk drives, read-only memory, optical disks, flash memory, and the like. The communication circuitry 84 may be configured to receive inputs (e.g., feedback signals, sensor signals, etc.) and transmit outputs (e.g., control signals, command signals, etc.) to, for example, the vehicle control system 42 (e.g., (via the communication circuitry 58 of the vehicle control system 42). In some embodiments, the communication circuitry 58, 84 may communicate with various components within the system 10 wirelessly. Additionally, in some embodiments, the implement control system 50 and the vehicle control system 42 may be disposed within the same housing, may share processors 54, 80, memory components 56, 82, and/or communication circuitry 58, 84. In other embodiments, the implement control system 50 and the vehicle control system 42 may be disposed within the separate housings. In further embodiments, the vehicle control system 42 and the implement control system 50 may be the same component.

The operator interface 52 may be disposed inside the cab 16 of the vehicle 12 and may be configured to display information for, and receive inputs from, the operator. In the illustrated embodiment, the operator interface 52 includes one or more computing devices and/or other computer-related components, such as one or more processors 60, one or more memory components 62, communication circuitry 64. The processor(s) 60 may include one or more general-purpose processors, one or more application specific integrated circuits, one or more field programmable gate arrays, or the like. The memory 62 may be any tangible, non-transitory, computer readable medium that is capable of storing instructions executable by the processor 60 and/or data that may be processed by the processor 60. The memory 62 may include volatile memory, such as random-access memory, or non-volatile memory, such as hard disk drives, read-only memory, optical disks, flash memory, and the like. The communication circuitry 64 may be configured to communicate with, for example, the vehicle control system 42 and/or the implement control system 50 (e.g., via the communication circuitry 58 of the vehicle control system 42 and/or the communication circuitry 84 of the implement control system 50). In some embodiments, the communication circuitry 58, 64, 84 may communicate with various components within the system 10 wirelessly. In some embodiments, the operator interface 52 and one or both of the vehicle control system 42 and the implement control system 50 may be disposed within the same housing, may share processors 54, 60, 80, memory components 56, 62, 82, and/or communication circuitry 58, 64, 84. In other embodiments, such systems may be disposed within the separate housings. In further embodiments, the operator interface 52 and one or both of the vehicle control system 42 and the implement control system 50 may be the same component.

As shown in FIG. 2, the operator interface 52 includes a display 66 configured to display information related to the agricultural machine 10 to the operator. The display 66 may be a screen, an array of LEDs, a series of gauges, a combination thereof, and/or any other arrangement. The operator interface 52 also includes an operator input 68 that enables a user to input information. The operator input 68 may be a keyboard, a series of buttons, a joystick, a mouse, a track pad, etc. In some embodiments, the display 66 and the operator input 68 may be a single component (e.g., a touchscreen).

Based on inputs received from the operator interface 52 and the navigation system 44, or other sensors disposed throughout the agricultural machine 1, as well as inputs that may be stored in the one or more memory components, the vehicle control system 42 may generate a path for the agricultural machine 10, and in some cases, automatically or semi-automatically control the various systems 46, 48, 50 to guide the machine 10 along the path.

It should be appreciated that, in several embodiments, the control system 40 may include a computing system 90 incorporating one or more computing or processor-based devices, including one or more of the computing devices and/or related systems described above. For instance, in one embodiment, the computing system 90 may include or incorporate one or more components of the vehicle control system 42, the navigation system 44, vehicle speed system 46, vehicle steering system 48, implement control system 50, and/or the operator interface 52, such as any of the processors, memory, communications circuitry, and/or any other computer-related components of such systems and/or sub-systems. In addition, the computing system 90 may include or may be communicatively coupled to one or more computing devices that are remote to the agricultural machine 10, such as one or more remote servers, base stations and/or the like. In such an embodiment, the vehicle-based or implement-based systems and/or sub-systems, such as the vehicle control system 42 and/or the like, may be configured to communicate with such remote computing devices over any suitable network, such as a wireless or wired network.

Figure 3:
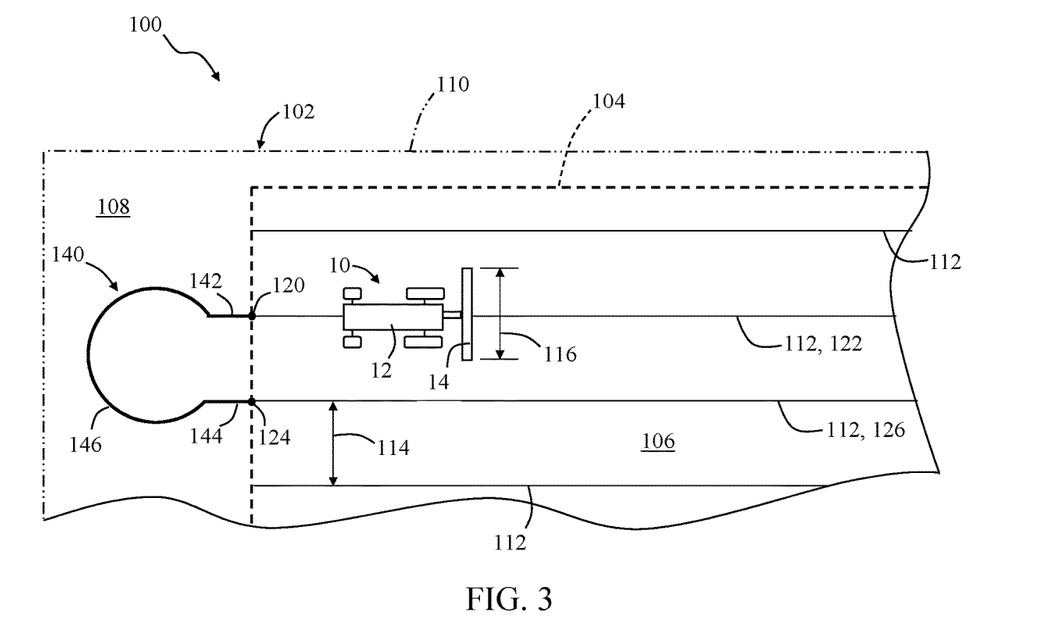
FIG. 3 illustrates a schematic view of an example field map showing an agricultural machine within a field in accordance with aspects of the present subject matter, particularly illustrating an end-of-row turn path defined between two guidance lines displayed on the map.

Referring now to FIG. 3, a schematic view of a portion of a field map 100 showing an agricultural machine 10 (including an agricultural vehicle 12 and an implement 14) within a field 102 is illustrated in accordance with aspects of the present subject matter. In several embodiments, the field map 100 may be configured to be presented to the vehicle operator (e.g., via the display 66 of the operator interface 52) during the performance an agricultural operation within the field 102 (e.g., planting, tilling, spraying, harvesting, and/or the like). For instance, the field map 100 may be presented to the operator to display swath or guidance lines, end-of-row turn paths, and/or other relevant information as an agricultural operation is being performed within the field 102.

As shown, the field map 100 includes a work boundary 104 defined relative to the field 102 that outlines or otherwise forms the outer perimeter of the portion of the field 102 within which the agricultural operation is to be performed (i.e., a work area 106 of the field 102). The work boundary 104 may, in several embodiments, correspond to a virtual boundary that is created based on previously obtained data, such as position data (e.g., GPS location coordinates) and/or operator-provided data. For instance, in one embodiment, the operator may input data associated with the location of the work boundary 104 relative to the field 102, such as by drawing the work boundary 104 relative to the field 102 within the field map 100 using the operator interface 52 (or any other suitable interface) or by providing other input data associated with the location of the work boundary 104 within the field 102. The work boundary 104 may then be superimposed onto or otherwise displayed within the field map 100 relative to the underlying map data associated with the field 102. Additionally, as shown in FIG. 3, the field 102 also includes a headlands area 108 disposed outside the work boundary 104 to facilitate end-of-row turns and/or the performance of other related actions. The headlands area 108 may, for example, be defined between the work boundary 102 of the field 102 and an outer field boundary 110 defining the outline or otherwise forming the outer perimeter of the field 102. The outer field boundary 110 may be a physical boundary for the field 102 (e.g., a fence, creek, ravine, road, etc.) or may correspond to a virtual boundary defining the outer perimeter of the field 102.

Moreover, as shown in FIG. 3, the field map 100 also includes a plurality of virtual swath or guidance lines 112 extending across the work area 106. In several embodiments, the agricultural vehicle 12 may be automatically, semi-automatically, or manually controlled to follow the guidance lines 112 across the work area 106. Thus, the guidance lines 112 may generally correspond to the paths along which the agricultural vehicle 12 is configured to be guided or driven during the performance of an agricultural operation. In one embodiment, the guidance lines 112 may be evenly spaced apart across the work area 106 of the field 102 based on a predetermined swath width 114. For instance, the operator may be allowed to input the desired swath width or the swath width may be calculated by the vehicle control system 42 based on other available data (e.g., a lateral footprint 116 of the agricultural machine 10 corresponding to the maximum lateral width of the vehicle 12 and/or the implement 14). In one embodiment, the guidance lines 112 may be generated by the vehicle control system 42 based on the swath width 114 and an initial guidance line defined across the work area 106. For instance, the operator may be asked to provide input data associated with the location and/or shape (e.g., straight or curved) of an initial guidance line or the vehicle 12 may simply be driven across the work area 106 to establish an initial guidance line. The remainder of the guidance lines 112 may then be generated by creating paths or lines across the work area 106 that extend parallel to the initial guidance line and that are spaced apart from one another by the swath width 114. It should be appreciated that, although the guidance lines 112 are shown in FIG. 3 as being straight lines, the guidance lines 112 may, instead, be curved. Additionally, in some embodiments, the guidance lines 112 may be oriented non-parallel relative to one another.

Upon reaching an end point 120 of a first path 122 defined along one of the guidance lines 122 during the performance of an agricultural operation, the agricultural vehicle 12 may proceed to a starting point 124 of a second path 126 defined along a different guidance line 122 by following an end-of-row (EOR) turn path 140 during the execution of an EOR turn. For example, when the vehicle 12 or implement 14 reaches the end point 120 of the first path 122, the implement 14 may be raised, turned off, or otherwise disengaged via the implement control system 50. This may be performed automatically by the vehicle control system 42 (and/or the implement control system 50) or by the operator via the operator interface 52. The vehicle 12 then follows the EOR turn path 140 to the starting point 124 of the second path 126. In one embodiment, the guidance of the vehicle 12 along the EOR turn path 140 is performed automatically by the vehicle control system 42. Alternatively, the EOR turn may be performed semi-automatically by allowing the operator to execute one or more operator-triggered actions (e.g., varying the vehicle speed and/or the like). When the vehicle 12 or implement 14 reaches the starting point 124 of the second path 126 (or at a location immediately before or after such starting point 124), the implement 14 is then lowered, turned on, and/or otherwise engaged to allow for the continuation of the agricultural operation as the vehicle 12 proceeds across the work area 106 along the second path 126.

In several embodiments, the specific shape, length, etc. of the EOR turn path 140 generated may vary depending on a selected turn path type for executing EOR turns during the performance of the agricultural operation. For instance, in one embodiment, the operator may be allowed to select a given turn path type from a number of different predetermined turn path types. In such an embodiment, the vehicle control system 42 may generally be configured to generate EOR turn paths 140 based on the selected turn path type. For example, an EOR turn path 140 between two different guidance lines 112 may be defined in a variety of different ways, such as along paths of different shapes and/or lengths. Such different path shapes/lengths can be characterized as different turn path types, thereby allowing an operator to select a desired turn path type based on, for instance, operator preferences, the lateral footprint 116 of the agricultural machine 110, available space within the headlands area 108, and/or the like. For instance, in the illustrated embodiment, the EOR turn path 140 corresponds to an "omega" turn path type characterized by an omega-shaped path including first and second straight segments 142, 144 extending from the end and start points 120, 124, respectively, of the associated paths 122, 124 and a semi-circular or arced segment 146 connecting the straight segments 142, 144. Other turn path types may include, but are not limited to, an "arcuate" turn path type (e.g., characterized by an arc-shaped path extending directly between each associated path 122, 126), a "P-turn" path type (e.g., characterized by a p-shaped path including straight segments extending from each associated path 122, 126 and an oblong or oval-like segment connecting the straight segments that projects outwardly to allow a wide turn along the outgoing side of the path (a "turn-in P-turn path type") or along the incoming side of the path (a "turn-out P=turn path type"), a "rectangular" turn path type (e.g., characterized by a substantially rectangular-shaped path including straight segments extending from each associated path 122, 126 and a straight connector segment extending between the straight segments with rounded-off corners at each transition between path segments) and/or the like. By providing various options for different turn path types, the operator may select the desired turn path type (e.g., via the operator interface 52) to best suit his/her needs given the current operating conditions, based on one or more parameters of the agricultural machine 10 and/or in view of the agricultural operation being performed.

In several embodiments, the overall length/size of the EOR turn path 140 generated based on the selected turn path type may vary depending on numerous factors, such as the minimum turning radius of the vehicle (e.g., as a function of speed), the lateral footprint 116 of the agricultural machine 10, and the distance between the end/start points 120, 124 of the associated guidance lines 112. Typically, such factors are sufficient to allow for suitable EOR turn paths to be generated by the vehicle control system 42, particularly when the field 102 has a work boundary 104 that defines a relatively simple shape (e.g., such as the rectangular shape shown in FIG. 3). However, when the work boundary 104 defines a more complex shape, EOR turn paths generated by the vehicle control system 42 based solely on such factors can result in all or a portion of agricultural machine 10 crossing over the work boundary 104. In such instances, guidance of the agricultural machine 10 along such paths can lead to undesirable results, such as crop damage, unnecessary soil compaction and/or other undesirable outcomes within the work area 104 of the field 102.

Figure 4A:
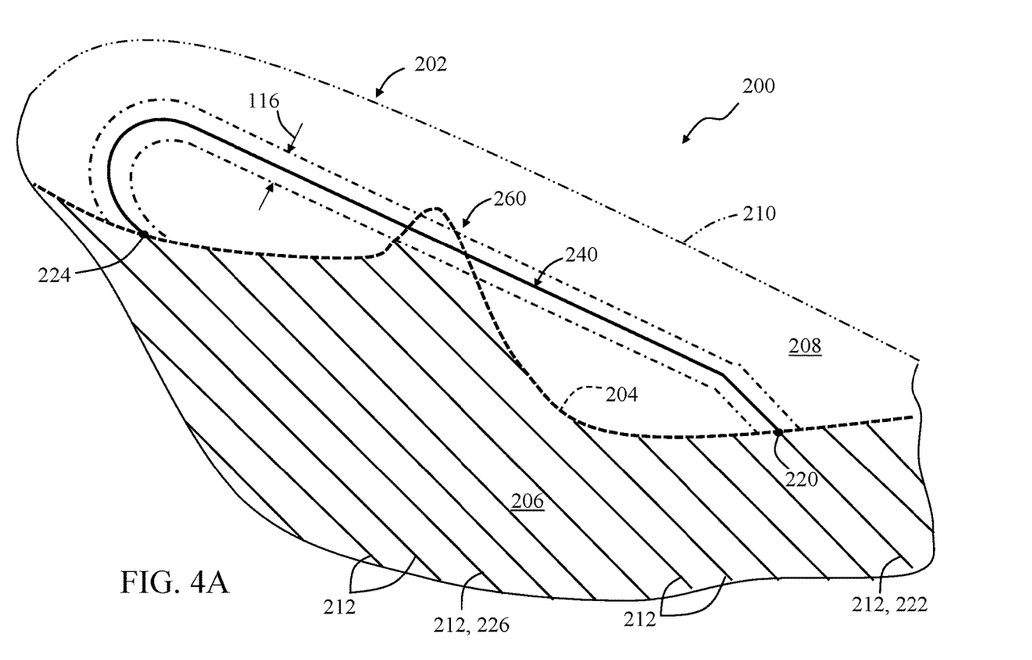
FIG. 4A illustrates a schematic view of another exemplary field map in accordance with aspects of the present subject matter, particularly illustrating an end-of-row turn path displayed on the map that crosses over a work boundary of the field.
Figure 4B:
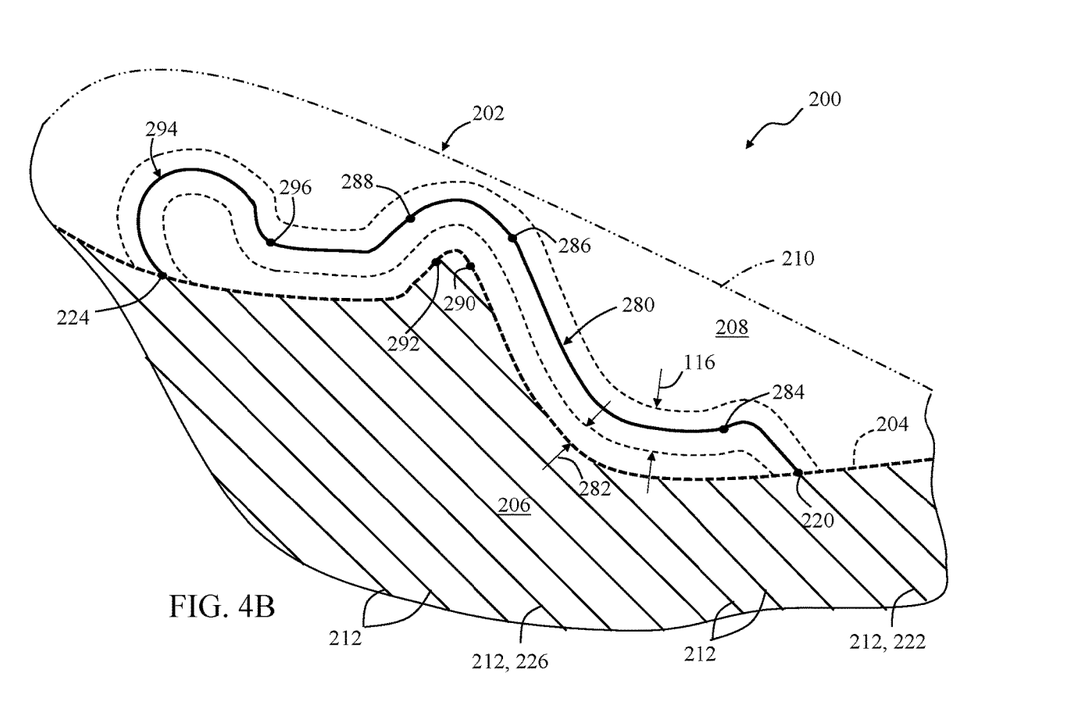
FIG. 4B illustrates another schematic view of the field map shown in FIG. 4A, particularly illustrating an alternative boundary-based end-of-row turn path displayed on the map that generally follows or tracks the profile of the work boundary of the field.

For instance, FIGS. 4A and 4B illustrated schematic views of a portion of another exemplary field map 200 in accordance with aspects of the present subject matter, particularly illustrating a portion of a field 202 having a work boundary 204 with a more complex shape than that shown in FIG. 3. As shown in FIGS. 4A and 4B, similar to the field map 100 described above, the work boundary 204 displayed on the field map 200 separates a work area 206 of the field 202 (e.g., across which an agricultural operation is to be performed) from a headlands area 208 of the field 202, with an outer field boundary 210 defining an outer perimeter of the field 202. The field map 200 also includes a plurality of guidance lines 212 spaced apart across the work area 206 along which an agricultural machine 10 (not shown in FIGS. 4A and 4B) is configured to be guided or driven as an agricultural operation is being performed within the field 202.

Additionally, as shown in FIG. 4A, an EOR turn path 240 is provided between an end point 220 of a first path 222 defined along one of the guidance lines 212 and a starting point 224 of a second path 226 defined along a different guidance line 226. Such EOR turn path 240 may, for instance, correspond to the path automatically generated by the vehicle control system 42 based upon the operator-selected or default EOR turn path type. As indicated above, the vehicle control system 42 may be configured to generate EOR turn paths based on an operator-selected turn path type that relies on one or more factors that are generally unrelated to the location of the work boundary 104 (e.g., the minimum turning radius of the agricultural machine 10, the lateral footprint 116 of the machine 10, and the distance between the end/start points of the associated guidance lines) to generate a turn path that can be achieved by the agricultural machine 10. In such instance, when the work boundary 104 defines a complex geometry or shape between the end/start points 220, 224 of the EOR turn path 240, the vehicle control system 42 will often generate a path that crosses over or intersects the work boundary 204. For instance, as shown in FIG. 2, the EOR turn path 240 crosses over the work boundary 104 (e.g., at location 260). As a result, if the agricultural machine 10 were to be guided or driven along the generated EOR turn path 240, both the vehicle 12 and the implement 14 would cross over the work boundary 204 and pass through a portion of the work area 206.

In the illustrated embodiment, the EOR turn path 240 passes directly through the work area 206. However, it should be appreciated that a portion(s) of the agricultural machine 10 may cross over the work boundary 204 and pass through the work area 206 without the EOR turn path 240 actually crossing or intersecting such boundary 204. For instance, the width profile or lateral footprint 116 of the agricultural machine 10 (e.g., as defined by the maximum lateral width of the vehicle 12 or implement 14, whichever is greater) is illustrated in FIG. 4A relative to the EOR turn path 240 to identify the portions of the field over which the agricultural machine 10 will traverse as the machine 10 is guided or driven along the path 240. With such a lateral footprint 116, an outer lateral section or portion of the vehicle 12 and/or the implement 14 can cross over the work boundary 204 despite the EOR turn path 240 being defined entirely within the headlands area 208. For instance, in instances in which a section of the EOR turn path 240 is spaced apart from the work boundary 204 by a distance that is less than one-half of the width of the lateral footprint 116 of the agricultural machine 10, at least a portion of the vehicle 12 and/or implement 14 will pass through the work area 206 as the machine 10 is traversed across such section of the EOR turn path 240 (assuming the lateral centerline of the machine 10 follows directly along the EOR turn path 240).

To avoid instances in which the agricultural machine 10 crosses over the work boundary 204 during the execution of an EOR turn, the present subject matter allows for the generation of a boundary-based EOR turn path that accounts for the exact location of the work boundary 204 within the field 202. Specifically, in several embodiments, the vehicle control system 42 may be configured to generate a boundary-based EOR turn path when it is identified that the agricultural machine 10 will cross over the work boundary 204 while using the initial EOR turn path generated based on the operator-selected or default turn path type (e.g., the EOR turn path 240 shown in FIG. 4A). For instance, the vehicle control system 42 may be configured to initially generate an EOR turn path using the default or operator-selected turn path type and assess the generated path and associated lateral footprint 116 of the agricultural machine 116 relative to location of the work boundary 204 within the field 202. In the event that the initial EOR turn path will result in a portion of the agricultural machine 10 (e.g., a portion of the vehicle 12 and/or the implement 14) crossing over or intersecting the work boundary 204, the vehicle control system 42 may be configured to generate a new EOR turn path that tracks or follows the work boundary 204, thereby preventing the agricultural machine 10 from being guided or driven through the work area 206 during the execution of the EOR turn.

For instance, FIG. 4B illustrates a boundary-based EOR turn path 280 generated as an alternative to or a replacement for the EOR turn path 240 shown in FIG. 4A. In general, the boundary-based EOR turn path 280 is generated based on the position of the work boundary 204 relative to the field 202 (e.g., based on the GPS location coordinates of the work boundary 204) and the maximum lateral width of the agricultural machine 10 such that the machine 10 is spaced apart from the work boundary 204 by at least a predefined minimum buffer distance 282 during the execution of the EOR turn. For instance, similar to the map view shown in FIG. 4A, the width profile or lateral footprint 116 of the agricultural machine 10 is illustrated in FIG. 4B relative to the EOR turn path 280. As shown, the boundary-based EOR turn path 280 is defined relative to the work boundary 204 such that the path 280 generally follows or tracks the profile of the boundary 204, but is spaced apart therefrom by a given offset distance based on the lateral footprint 116 of the agricultural machine 10 such that the vehicle 12 and/or implement 14 (whichever is wider) is maintained a distance away from the work boundary 204 that is equal to or greater than the buffer distance 282. It should be appreciated that, when generating the boundary-based EOR turn path 280, short path segments will generally be defined at the end point 220 of the first path 222 and at the start point 224 of the second path 226 at which at least a portion of the agricultural machine 10 is located closer to the work boundary 204 than the buffer distance 282 as the machine 10 transitions out of the work area 204 (e.g., at end point 220) and subsequently transitions back into the work area (e.g., at start point 224). However, outside of such short start/end path segments, the remainder of the boundary-based EOR turn path 280 is generally defined to maintain the agricultural machine 10 spaced apart from the work boundary 204 by at least the buffer distance 282.

It should be appreciated that the minimum buffer distance 282 used to generate the boundary-based EOR turn path 280 may generally correspond to any suitable distance. In one embodiment, the minimum buffer distance 282 may be selected based on the accuracy of the location data received from the navigation system 44. For instance, when highly accurate data is being received from the navigation system 44 (e.g., centimeter or inch-level accuracy), the minimum buffer distance 282 may correspond to mere centimeters or inches (e.g., 1 to 6 inches). However, for a less accurate navigation system 44, the minimum buffer distance 282 may be somewhat larger (e.g., 1 to 6 feet) to ensure that the agricultural machine 10 does not cross the work boundary 204 during the execution of the EOR turn. It should also be appreciated that the minimum buffer distance 282 may be stored within the control system's memory 56 as a default value from the manufacturer or may be selected or inputted directly by the operator. Additionally, in instances in which the minimum buffer distance 282 is provided as a default value, the operator may also be allowed to adjust the buffer distance 282, as desired.

In several embodiments, the boundary-based EOR turn path 280 may be generated such that the path 280 is maintained substantially parallel to the work boundary 204 of the field 202, thereby allowing the lateral footprint 116 of the agricultural machine 10 to be generally maintained at the minimum buffer distance 282 from the work boundary 204 along the length of the path 280. However, the ability to generate an EOR turn path that extends parallel to the work boundary 204 while maintaining the agricultural machine 10 spaced apart from the boundary 204 by at least the minimum buffer distance 282 is constrained by the minimum turning radius of the machine (e.g., the minimum turning radius of the vehicle 12), which varies as a function of the current vehicle speed. For instance, as shown in FIG. 4B, a first section of the work boundary 204 (e.g., extending from point 220 to point 290) defines a curved profile having a radius of curvature that is greater than the minimum turning radius of the agricultural machine 10. As a result, the corresponding section of the boundary-based EOR turn path 280 (e.g., extending from point 284 to point 286) can be generated so as to extend generally parallel to this section of the work boundary 204 while maintaining the agricultural machine 10 at the minimum buffer distance 282 from the work boundary 204 along the length of such path section. In contrast, as shown in FIG. 4B, a second section of the work boundary 204 (e.g., extending from point 290 to point 292) defines a curved profile having a radius of curvature that is less than the minimum turning radius of the agricultural machine 10. In such instance, the minimum turning radius prevents the machine 10 from being guided/driven parallel to this second section of the work boundary 204 while still maintaining the machine 10 spaced apart from the boundary 204 by at least the minimum buffer distance 282. Accordingly, the corresponding section of the boundary-based EOR turn path 280 (e.g., extending from point 286 to point 288) has been defined to accommodate the machine's minimum turning radius, which results in a wider turn around the tight radius of the work boundary 204. However, once the radius of curvature of the work boundary 204 subsequently increases back above the machine's minimum turning radius, the boundary-based EOR turn path 280 can again be matched to the profile of the work boundary 204 such that the path 280 extends generally parallel thereto.

Additionally, it should be appreciated that, upon reaching a specified distance from the start point 224 of the second path 226, the EOR turn path 280 may incorporate a final path approach segment during which the machine 10 is guided along a suitable route to properly align the machine with the guidance line 212 associated with the second path 226. For instance, as shown in FIG. 4B, the boundary-based EOR turn path 280 incorporates a path approach segment 295 (e.g., extending from point 296 to point 224) along which the agricultural machine 10 is initially guided away from the work boundary 204 along an arced pathway to ensure that the machine 10 is generally oriented parallel to the guidance line 212 associated with the second path 226 prior to reaching the boundary 204 (e.g., at start point 224). Such path approach segment 294 may generally be selected, for example, based on the minimum turning radius of the machine 10 and may generally have any suitable shape/length.

It should also be appreciated that, in addition to being used to generate an alternative or replacement EOR turn path in instances in which the initially generated path crosses the work boundary 204 (or as an alternative thereto), the boundary-based EOR turn paths described herein may be provided as an optional turn path type for selection by the operator. For instance, in one embodiment, the operator may be allowed to select boundary-based EOR turns as a default turn path type for executing EOR turns during the performance of an agricultural operation.

Figure 5:
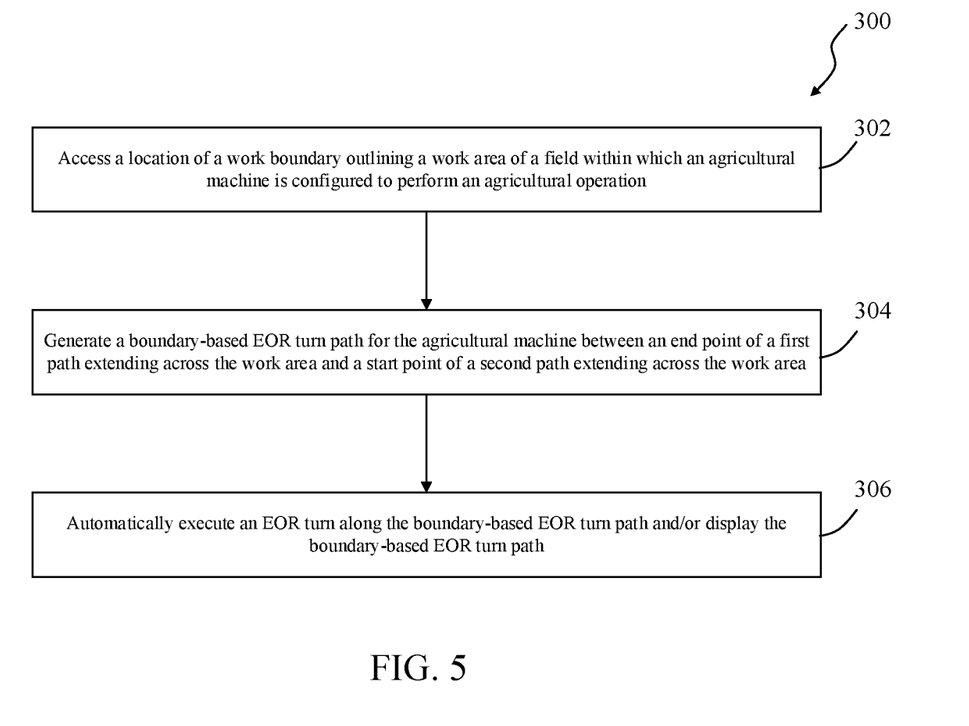
FIG. 5 illustrates a flow diagram of one embodiment of a method for implementing end-of-row turns for agricultural machines in accordance with aspects of the present subject matter.

Referring now to FIG. 5, a flow diagram of one embodiment of a method 300 for implementing end-of-row (EOR) turns for an agricultural machine is illustrated in accordance with aspects of the present subject matter. For purposes of discussion, the method 300 will generally be described herein with reference to the agricultural machine 10 and system components described above with reference to FIGS. 1 and 2. However, it should be appreciated that the disclosed method 300 may be executed in association with any suitable agricultural machine having any other suitable machine configuration (including any suitable vehicle and/or implement configuration) and/or with any system having any other suitable system configuration and/or combination of system components. Additionally, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302) the method 300 may include accessing a location of a work boundary outlining a work area of a field within which an agricultural machine is configured to perform an agricultural operation. Specifically, as indicated above, the position of the work boundary 104, 204 of a field 102, 202 may be stored, for example, within the memory of one or more computing devices of the computing system 90 (e.g., in the form of GPS coordinates), such as the memory 56 of the vehicle control system 42. In such an embodiment, the computing system 90 (e.g., via the vehicle control system 42) may access the position data associated with the work boundary 104, 204 to identify the location of the boundary 104, 204 within the field 102, 202.

Additionally, at (304), the method 300 may include generating a boundary-based EOR turn path for the agricultural machine between an end point of a first path extending across the work area and a start point of a second path extending across the work area. As indicated above, a boundary-based EOR turn path 280 may be defined relative to the work boundary 204 such that the agricultural machine 10 is maintained spaced apart from the work boundary 204 by at least a minimum buffer distance 282 as the agricultural machine 10 is traversed between the end point 220 of the first path 222 and the start point 224 of the second path 226. As a result, the boundary-based EOR turn path 280 may ensure that no portion of the agricultural machine 10 crosses over the work boundary 204 during execution of the associated EOR turn.

Moreover, at (306), the method 300 may include automatically executing an EOR turn along the boundary-based EOR turn path and/or displaying the boundary-based EOR turn path. For instance, as indicated above, the computing system 90 (e.g., via the vehicle control system 42) may be configured to automatically guide the agricultural machine 10 (e.g., via control of the vehicle speed and steering systems 46, 48) to follow a given path. In such instances, upon generation of the boundary-based EOR turn path, the computing system 90 may be configured to automatically guide the agricultural machine 10 along such path to execute an EOR turn. In addition to such automatic control (or as an alternative thereto), the computing system 90 (e.g., via the operator interface 52) may be configured to display the boundary-based EOR turn path to the machine operator. For instance, as indicated above, the boundary-based EOR turn path may be displayed in association with a field map on the display 66 of the operator interface 52 to allow the operator to view the generated turn path.

Figure 6:
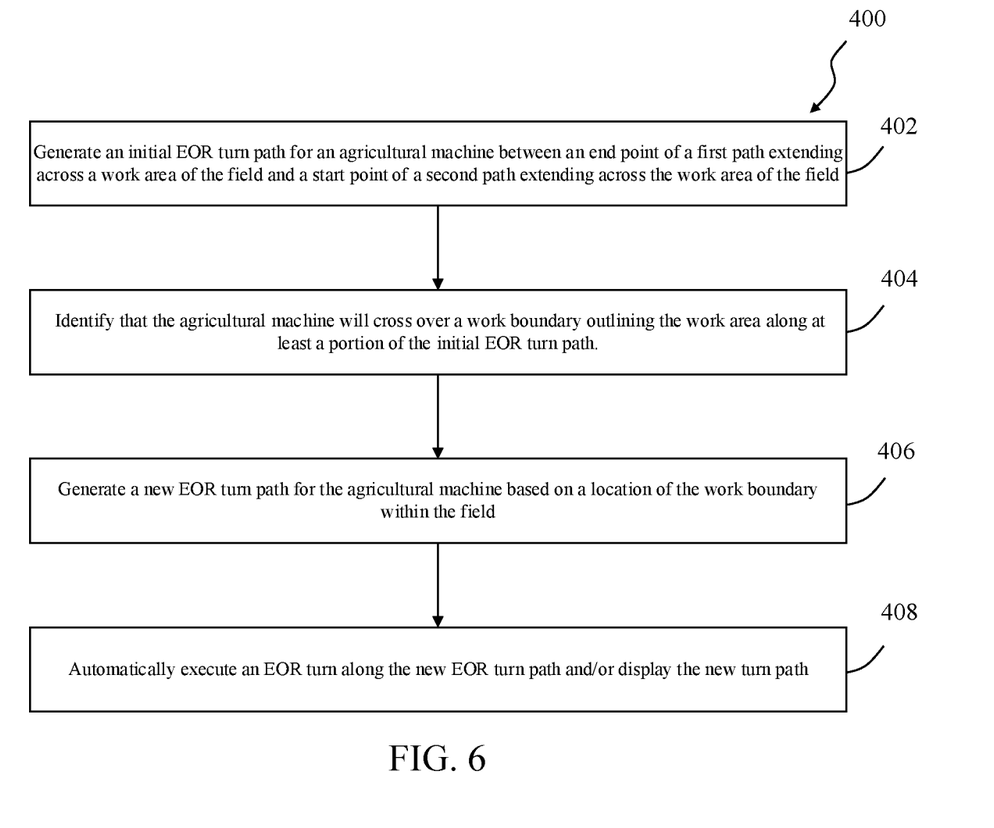
FIG. 6 illustrates a flow diagram of another embodiment of a method for implementing end-of-row turns for agricultural machines in accordance with aspects of the present subject matter.

Referring now to FIG. 6, a flow diagram of another embodiment of a method 400 for implementing end-of-row (EOR) turns for an agricultural machine is illustrated in accordance with aspects of the present subject matter. For purposes of discussion, the method 400 will generally be described herein with reference to the agricultural machine 10 and system components described above with reference to FIGS. 1 and 2. However, it should be appreciated that the disclosed method 400 may be executed in association with any suitable agricultural machine having any other suitable machine configuration (including any suitable vehicle and/or implement configuration) and/or with any system having any other suitable system configuration and/or combination of system components. Additionally, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (402) the method 400 may include generating an initial EOR turn path for an agricultural machine between an end point of a first path extending across a work area of the field and a start point of a second path extending across the work area of the field. As indicated above, the computing system 90 (e.g., via the vehicle control system 92) may, in certain instances, be configured to generate an initial EOR turn path 240 based on an operator-selected or default turn path type.

Additionally, at (404), the method 400 includes identifying that the agricultural machine will cross over a work boundary outlining the work area along at least a portion of the initial EOR turn path. As indicated above, the computing system 90 (e.g., via the vehicle control system 42) may be configured to assess any generated EOR turn paths 240 to identify instances in which at least a portion of the machine 10 will cross over the work boundary 204 of the field 202 during execution of the associated EOR turn. For instance, the computing system 90 may be configured to compare the route defined by the initially generated EOR turn path 240 to the location of the work boundary 204 within the field 202 and identify locations at which the lateral footprint 116 of the agricultural machine 10 will cross over or otherwise intersect the work boundary 204.

Moreover, at (406), the method 400 includes generating a new EOR turn path for the agricultural machine based on a location of the work boundary within the field. As indicated above, a boundary-based EOR turn path 280 may be defined relative to the work boundary 204 such that the agricultural machine 10 is maintained spaced apart from the work boundary 204 by at least a minimum buffer distance 282 as the agricultural machine 10 is traversed between the end point 220 of the first path 222 and the start point 224 of the second path 226. As a result, the boundary-based EOR turn path 280 may ensure that no portion of the agricultural machine 10 crosses over the work boundary 204 during execution of the associated EOR turn.

Referring still to FIG. 6, at (408), the method 400 may include automatically executing an EOR turn along the new EOR turn path and/or displaying the new turn path. For instance, as indicated above, the computing system 90 (e.g., via the vehicle control system 42) may be configured to automatically guide the agricultural machine 10 (e.g., via control of the vehicle speed and steering systems 46, 48) to follow a given path. In such instances, upon generation of the boundary-based EOR turn path, the computing system 90 may be configured to automatically guide the agricultural machine 10 along such path to execute an EOR turn. In addition to such automatic control (or as an alternative thereto), the computing system 90 (e.g., via the operator interface 52) may be configured to display the boundary-based EOR turn path to the machine operator. For instance, as indicated above, the boundary-based EOR turn path may be displayed in association with a field map on the display 66 of the operator interface 52 to allow the operator to view the generated turn path.

It is to be understood that, in one embodiment, the steps of the methods 300, 400 are performed by a computing device(s) upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing device(s) described herein, such as the method 300, 400, is implemented in software code or instructions which are tangibly stored on a tangible computer readable medium. The computing device(s) loads the software code or instructions via a direct interface with the computer readable medium or via a wired and/or wireless network. Upon loading and executing such software code or instructions by the computing device(s), the computing device(s) may perform any of the functionality of the computing device(s) described herein, including any steps of the method 300, 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for implementing end-of-row (EOR) turns within a field, the method comprising:
   accessing, with a computing system, a location of a work boundary outlining a work area of the field within which an agricultural machine is configured to perform an agricultural operation, the work boundary and an outer field boundary defining a headland area therebetween;
   generating, with the computing system, a boundary-based EOR turn path in the headland area and within the outer field boundary for the agricultural machine between an end point of a first path extending across the work area and a start point of a second path extending across the work area, the boundary-based EOR turn path being defined relative to the work boundary such that the agricultural machine is maintained in the headland area spaced outwardly apart from the work boundary by at least a minimum buffer distance as the agricultural machine is traversed between the end point of the first path and the start point of the second path, the end point of the first path and the start point of the second path each being located at the work boundary; and
   automatically executing an EOR turn along the boundary-based EOR turn path by automatically controlling an operation of at least one of a steering system or a speed system of the agricultural machine to guide the agricultural machine along the boundary-based EOR turn path.

2. The method of claim 1, wherein generating the boundary-based EOR turn path comprises generating the boundary-based EOR turn path such that a lateral footprint of the agricultural machine is maintained spaced outwardly apart from the work boundary by at least the minimum buffer distance as the agricultural machine is traversed between the end point of the first path and the start point of the second path.

3. The method of claim 2, wherein the lateral footprint is defined by a maximum lateral width of at least one of a vehicle of the agricultural machine or an implement of the agricultural machine.

4. The method of claim 1, wherein generating the boundary-based EOR turn path comprises generating the boundary-based EOR turn path such that the boundary-based EOR turn path extends substantially parallel to the work boundary along sections of the work boundary having a radius of curvature that is greater than a minimum turning radius of the agricultural machine.

5. The method of claim 1, further comprising displaying the boundary-based EOR turn path on a display device communicatively coupled to the computing system.

6. A method for implementing end-of-row (EOR) turns within a field, the field including a work area within which an agricultural operation is to be performed, the method comprising:
   generating, with a computing system, an initial EOR turn path for an agricultural machine between an end point of a first path extending across the work area and a start point of a second path extending across the work area, the work area being outlined by a work boundary, the work boundary and an outer field boundary defining a headland area therebetween;
   identifying, with the computing system, that at least a portion of the agricultural machine will cross over the work boundary along at least a portion of the initial EOR turn path;
   generating, with the computing system, a new EOR turn path in the headland area and within the outer field boundary for the agricultural machine based on a location of the work boundary within the field, the new EOR turn path being defined relative to the work boundary such that the agricultural machine is maintained in the headland area spaced outwardly apart from the work boundary by at least a minimum buffer distance as the agricultural machine is traversed between the end point of the first path and the start point of the second path, the end point of the first path and the start point of the second path each being located at the work boundary; and automatically executing an EOR turn along the new EOR turn path by automatically controlling an operation of at least one of a steering system or a speed system of the agricultural machine to guide the agricultural machine along the new EOR turn path.

7. The method of claim 6, wherein generating the initial EOR turn path comprises generating the initial EOR turn path based on a default EOR turn path type selected from a plurality of predetermined EOR turn path types and wherein generating the new EOR turn path comprises generating the new EOR turn path as a replacement for the initial EOR turn path.

8. The method of claim 6, wherein identifying that the at least a portion of the agricultural machine will cross over the work boundary comprises analyzing a lateral footprint of the agricultural machine relative to the initial EOR turn path to identify an intersection between the lateral footprint and the work boundary along the at least a portion of the initial EOR turn path.

9. The method of claim 8, wherein the lateral footprint is defined by a maximum lateral width of at least one of a vehicle of the agricultural machine or an implement of the agricultural machine.

10. The method of claim 8, wherein generating the new EOR turn path comprises generating the new EOR turn path such that the lateral footprint of the agricultural machine is maintained spaced outwardly apart from the work boundary by at least the minimum buffer distance as the agricultural machine is traversed between the end point of the first path and the start point of the second path.

11. The method of claim 6, wherein generating the new EOR turn path comprises generating the new EOR turn path such that the new EOR turn path extends substantially parallel to the work boundary along sections of the work boundary having a radius of curvature that is greater than a minimum turning radius of the agricultural machine.

12. The method of claim 6, further comprising displaying the new EOR turn path on a display device communicatively coupled to the computing system.

13. A system for implementing end-of-row (EOR) turns within a field, the system comprising:
an agricultural machine comprising an agricultural vehicle and an agricultural implement;
a computing system provided in operative association with the agricultural machine, the computing system including a processor and associated memory, the memory storing instructions that, when executed by the processor, configure the computing system to:
access a location of a work boundary outlining a work area of the field within which the agricultural machine is configured to perform an agricultural operation, the work boundary and an outer field boundary defining a headland area therebetween;
generate a boundary-based EOR turn path in the headland area and within the outer field boundary for the agricultural machine between an end point of a first path extending across the work area and a start point of a second path extending across the work area, the boundary-based EOR turn path being defined relative to the work boundary such that the agricultural machine is maintained in the headland area spaced outwardly apart from the work boundary by at least a minimum buffer distance as the agricultural machine is traversed between the end point of the first path and the start point of the second path, the end point of the first path and the start point of the second path each being located at the work boundary; and
automatically execute an EOR turn along the boundary-based EOR turn path by automatically controlling an operation of at least one of a steering system or a speed system of the agricultural machine to guide the agricultural machine along the boundary-based EOR turn path.

14. The system of claim 13, wherein the computing system is configured to generate the boundary-based EOR turn path such that a lateral footprint of the agricultural machine is maintained spaced outwardly apart from the work boundary by at least the minimum buffer distance as the agricultural machine is traversed between the end point of the first path and the start point of the second path.

15. The system of claim 14, wherein the lateral footprint is defined by a maximum lateral width of the agricultural vehicle or the agricultural implement.

16. The system of claim 14, wherein the computing system is configured to generate the boundary-based EOR turn path such that the boundary-based EOR turn path extends substantially parallel to the work boundary along sections of the work boundary having a radius of curvature that is greater than a minimum turning radius of the agricultural machine.

* * * * *